(12) United States Patent
Chang et al.

(10) Patent No.: US 11,740,709 B2
(45) Date of Patent: Aug. 29, 2023

(54) IMAGE QUALITY IMPROVING METHOD, OPTICAL NAVIGATION DEVICE CONTROL METHOD, AND OPTICAL NAVIGATION DEVICE USING THE METHODS

(71) Applicant: PixArt Imaging Inc., Hsin-Chu (TW)

(72) Inventors: Bo-Yi Chang, Hsin-Chu (TW); Yao-Hsuan Lin, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/343,754

(22) Filed: Jun. 10, 2021

(65) Prior Publication Data
US 2022/0397966 A1 Dec. 15, 2022

(51) Int. Cl.
| | | |
|---|---|---|
| *G06F 3/03* | (2006.01) | |
| *G06F 3/0354* | (2013.01) | |
| *H04N 23/71* | (2023.01) | |

(52) U.S. Cl.
CPC ........ *G06F 3/0321* (2013.01); *G06F 3/03543* (2013.01); *H04N 23/71* (2023.01)

(58) Field of Classification Search
None
See application file for complete search history.

(56) References Cited

U.S. PATENT DOCUMENTS

| | | | | |
|---|---|---|---|---|
| 2006/0125794 A1* | 6/2006 | Afriat | ................. | G06F 1/32 345/166 |
| 2011/0181511 A1* | 7/2011 | Yang | ................. | G06V 10/141 345/158 |
| 2012/0038554 A1* | 2/2012 | Wu | ................. | G06F 3/038 348/135 |
| 2014/0152567 A1* | 6/2014 | Chen | ................. | G06T 5/009 345/166 |
| 2014/0191971 A1* | 7/2014 | Chen | ................. | G06F 3/0317 345/166 |
| 2016/0242657 A1* | 8/2016 | Wang | ................. | A61B 5/0261 |
| 2018/0267626 A1* | 9/2018 | Wang | ................. | G06F 3/0383 |
| 2019/0294265 A1* | 9/2019 | Lee | ................. | G06F 3/0362 |
| 2021/0405770 A1* | 12/2021 | Chauvin | ................. | G06F 3/0395 |
| 2021/0405775 A1* | 12/2021 | Chauvin | ................. | G06F 3/03543 |

FOREIGN PATENT DOCUMENTS

| | | | | |
|---|---|---|---|---|
| CN | 104679286 A | * | 6/2015 | |
| JP | 2012103815 A | * | 5/2012 | |
| WO | WO-2014210368 A1 | * | 12/2014 | ......... G06K 9/00986 |

* cited by examiner

*Primary Examiner* — Kirk W Hermann
(74) *Attorney, Agent, or Firm* — Winston Hsu

(57) ABSTRACT

A computer readable recording medium comprising at least one program stored therein. An image quality improving method is performed when the program is executed. The image quality improving method comprises: (a) computing brightness contrast information of an original image captured by an image sensor of an optical navigation device; (b) computing a brightness variation level of the original image; and (c) improving an image quality of the original image based on the brightness contrast information and the brightness variation level.

8 Claims, 4 Drawing Sheets

IMAGE QUALITY IMPROVING METHOD, OPTICAL NAVIGATION DEVICE CONTROL METHOD, AND OPTICAL NAVIGATION DEVICE USING THE METHODS

BACKGROUND OF THE INVENTION

1. Field of the Invention

The present invention relates to an image quality improving method, an optical navigation device control method, and an optical navigation device using the methods, and particularly relates to an image quality improving method, an optical navigation device control method which can calibrate image variations, and an optical navigation device using the methods.

2. Description of the Prior Art

An optical navigation device, such as an optical mouse, becomes more and more popular in recent years. However, various deviations may exist during the mass production of optical navigation devices. These deviations may come from lenses, component assembly, light sources, image sensors or surfaces on which the optical navigation device is located. Also, the deviations may cause variations (e.g., brightness variation) to the images captured by the image sensor. The image recognition accuracy of the optical navigation device may decrease due to such image variations.

Therefore, a method for improving such issue is needed.

SUMMARY OF THE INVENTION

Therefore, one objective of the present invention is to provide an image quality improving method which can calibrate the image variations.

Another objective of the present invention is to provide an optical navigation device which can calibrate the image variations, and a control method thereof.

One embodiment of the present invention discloses a computer readable recording medium comprising at least one program stored therein. An image quality improving method is performed when the program is executed. The image quality improving method comprises: (a) computing brightness contrast information of an original image captured by an image sensor of an optical navigation device; (b) computing a brightness variation level of the original image; and (c) improving an image quality of the original image based on the brightness contrast information and the brightness variation level.

Another embodiment of the present invention discloses a computer readable recording medium comprising at least one program stored therein. An optical navigation device control method is performed when the program is executed. The optical navigation device control method comprising: (a) computing brightness contrast information of an original image captured by an image sensor of an optical navigation device; (b) computing a brightness variation level of the original image; (c) improving an image quality of the original image based on the brightness contrast information and the brightness variation level, to generate an adjusted image; and (d) controlling the optical navigation device based on the adjusted image.

Still another embodiment of the present invention discloses an optical navigation device, comprising: an image sensor; and a processing circuit. The processing circuit computes brightness contrast information of an original image captured by the image sensor, computes a brightness variation level of the original image, improves an image quality of the original image based on the brightness contrast information and the brightness variation level, to generate an adjusted image, and controls the optical navigation device based on the adjusted image.

In view of above-mentioned embodiments, image variations caused by various reasons such as mass production can be calibrated. Thus the image quality can be improved. Also, the operations of the optical navigation device performed based on the adjusted images can be more accurate.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
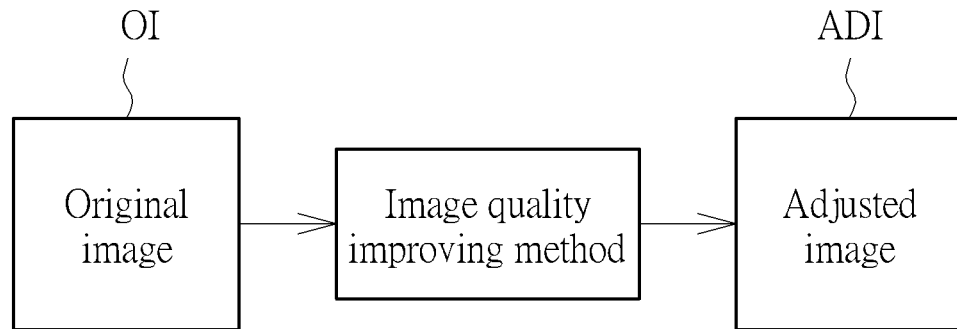
FIG. 1 is a schematic diagram illustrating an image quality improving method according to one embodiment of the present invention.

FIG. 1 is a schematic diagram illustrating an image quality improving method according to one embodiment of the present invention. As shown in FIG. 1, an original image OI, which is sensed by an image sensor of an optical navigation device, is processed by an image quality improving method to generate an adjusted image ADI. The adjusted image ADI can be applied for any application. In one embodiment, the adjusted image ADI is directly used by the optical navigation device for navigation. In another embodiment, the adjusted image ADI is transmitted to an AI (Artificial Intelligence) system for learning. The AI system is used for controlling the navigation of the optical navigation device.

Figure 2:
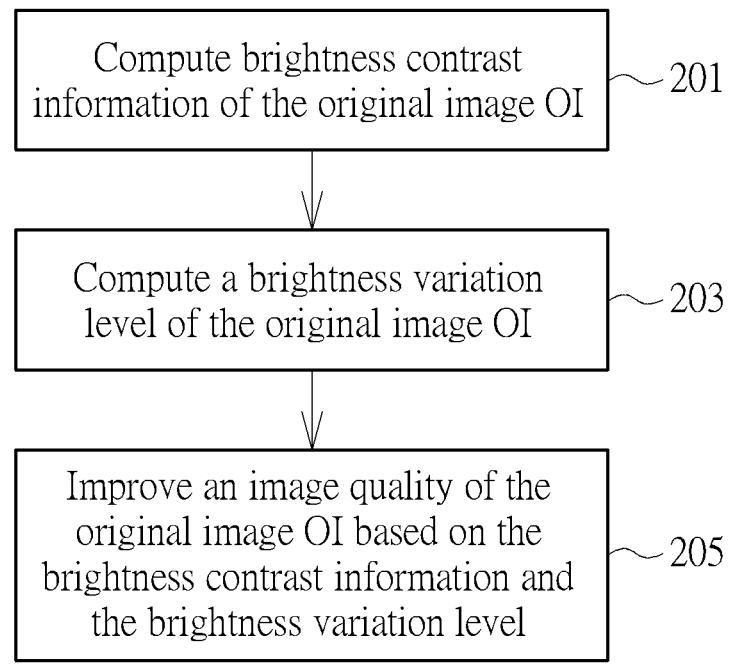
FIG. 2 is a flow chart illustrating the image quality improving method illustrated in FIG. 1, according to one embodiment of the present invention.

FIG. 2 is a flowchart illustrating the image quality improving method illustrated in FIG. 1, according to one embodiment of the present invention. As shown in FIG. 2, the image quality improving method comprises following steps:

Step 201

Compute brightness contrast information of the original image OI.

Step 203

Compute a brightness variation level of the original image OI.

Step 205

Improve an image quality of the original image OI based on the brightness contrast information and the brightness variation level. In one embodiment, "improve the image quality" means adjusting the original image OI to make brightness of the original image OI more stable but does not affect relations between pixel values of pixels in the original image OI.

In one embodiment, the step 205 improves the image quality of the original image OI by an equation of:

$$\frac{B\_T - B\_Oav}{Std\_O}.$$

B_T is a brightness value of a pixel of the original image OI, B_Oav is an average brightness value of the original image OI, and Std_O is a standard deviation of brightness values of the original image OI. The brightness contrast information comprises B_T and B_Oav, and the brightness variation level comprises Std_O.

For example, the original image OI comprises a pixel P_1 having a pixel value PV_1 and a pixel P_2 having a pixel value PV_2. In such case, the pixel value of the pixel P_1 is adjusted to an adjusted pixel value APV_1 which equals to $$\frac{PV\_1 - B\_Oav}{Std\_O}$$

and the pixel value of the pixel P_2 is changed to an adjusted pixel value APV_2 which equals to $$\frac{PV\_2 - B\_Oav}{Std\_O}.$$

All pixels of the original image OI are processed following such rule, and the adjusted image ADI is generated accordingly.

Figure 3:
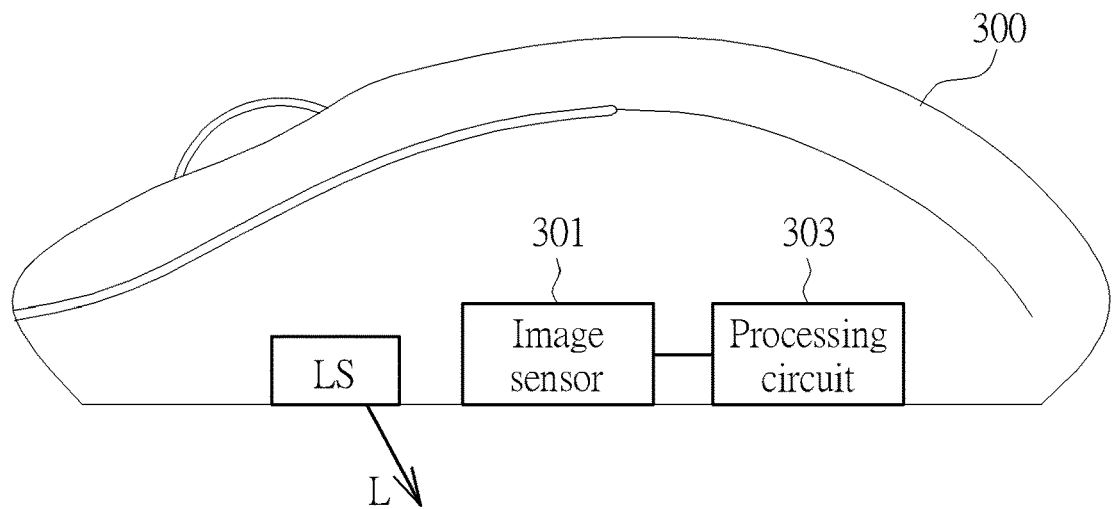
FIG. 3 is a block diagram illustrating an optical navigation device according to one embodiment of the present invention.

In one embodiment, the image quality improving method illustrated in FIG. 1 and FIG. 2 are applied to an optical navigation device, but not limited. FIG. 3 is a block diagram illustrating an optical navigation device 300 according to one embodiment of the present invention, which uses the above-mentioned image quality improving method. Please note, in the embodiment of FIG. 3, the optical navigation device 300 is an optical mouse, but is not limited. The optical navigation device 300 can be any other optical navigation device, such as an optical touch control device or an automatic cleaner such as a robot cleaner. As illustrated in FIG. 3, the optical navigation device 300 comprises an image sensor 301 and a processing circuit 303. In one embodiment, the optical navigation device 300 further comprises a light source LS configured to generate light L, which is used for generating the original image OI.

The processing circuit 303 is configured to compute brightness contrast information of the original image OI captured by the image sensor 203, and to compute a brightness variation level of the original image OI. Also, the processing circuit 303 improves an image quality of the original image OI based on the brightness contrast information and the brightness variation level, to generate the adjusted image ADI. Then, the processing circuit 303 controls the optical navigation device 300 based on the adjusted image ADI.

As above-mentioned, in one embodiment, the processing circuit 303 improves the image quality by an equation of:

$$\frac{B\_T - B\_Oav}{Std\_O}.$$

B_T is a brightness value of a pixel of the original image OI, B_Oav is an average brightness value of the original image OI, and Std_O is a standard deviation of brightness values of the original image OI. The brightness contrast information comprises B_T and B_Oav, and the brightness variation level comprises Std_O.

Figure 4:
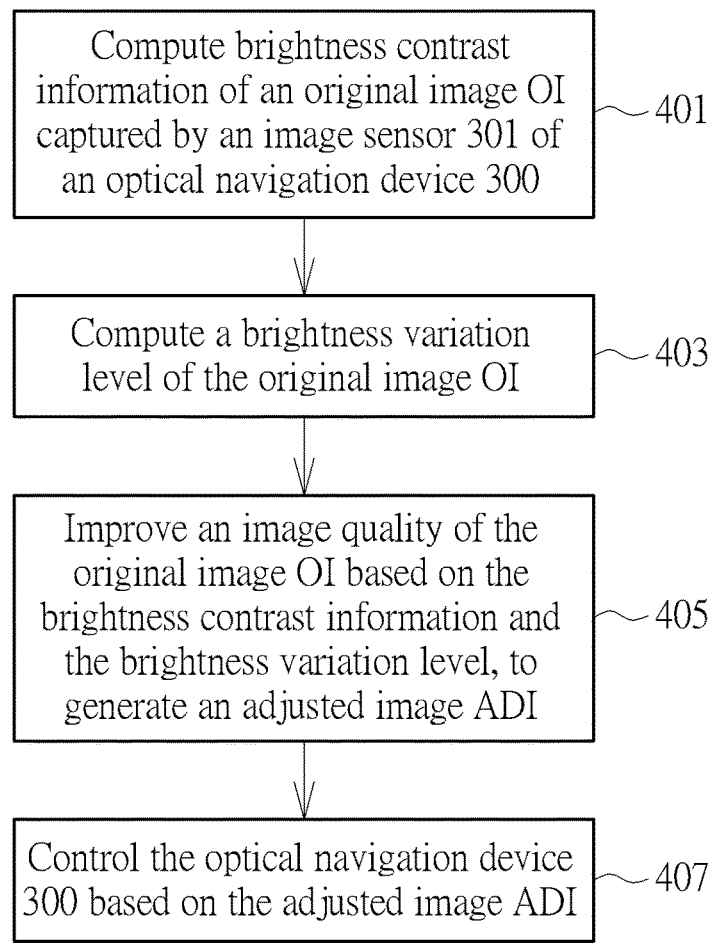
FIG. 4 is a flow chart illustrating an optical navigation device control method according to one embodiment of the present invention.

Based on the descriptions of FIG. 3, an optical navigation device control method can be acquired. FIG. 4 is a flow chart illustrating an optical navigation device control method according to one embodiment of the present invention, corresponding to the embodiment illustrated in FIG. 3. The embodiment in FIG. 4 comprises following steps, which can be performed by the above-mentioned processing circuit 303.

Step 401

Compute brightness contrast information of an original image OI captured by an image sensor 301 of an optical navigation device 300.

Step 403

Compute a brightness variation level of the original image OI.

Step 405

Improve an image quality of the original image OI based on the brightness contrast information and the brightness variation level, to generate an adjusted image ADI.

Such step can be implemented by above-mentioned equation $$\frac{B\_T - B\_Oav}{Std\_O}.$$

Step 407

Control the optical navigation device 300 based on the adjusted image ADI.

Figure 5:
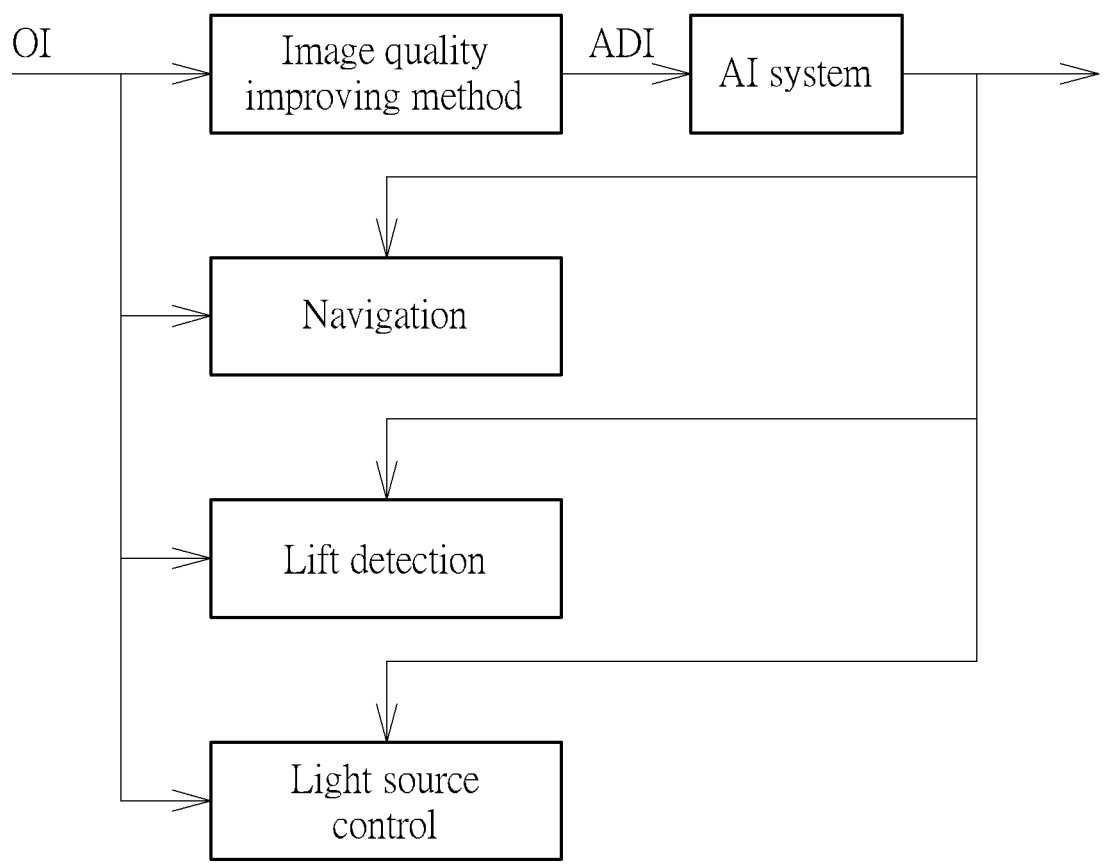
FIG. 5 is a schematic diagram illustrating an optical navigation device control method according to one embodiment of the present invention.

Various operations of the optical navigation device 300 can be controlled based on the adjusted image ADI. It will be appreciated the operations can be controlled by a plurality of adjusted images ADI which are generated following the above-mentioned embodiments, rather than by only one adjusted image ADI. FIG. 5 is a schematic diagram illustrating an optical navigation device control method according to one embodiment of the present invention, which illustrates examples of operations controlled based on the adjusted image ADI. Please note, in the embodiment of FIG. 5, the above-mentioned processing circuit 303 applies an AI system. In such case, the adjusted image ADI is used for the learning of the AI system, which is used for controlling the operations of the optical navigation device 300. However, in another embodiment, the processing circuit 303 does not use AI system and directly controls the operations of the optical navigation device 300 based on the adjusted image ADI. Alternatively, the processing circuit 303 can use another algorithm to control the operations of the optical navigation device 300 based on the adjusted image ADI.

As shown in FIG. 5, the navigation of the optical navigation device 300 can be controlled based on the adjusted image ADI. For more detail, movements of the optical navigation device 300 can be computed based on displacement between adjusted images ADI, and navigation is accordingly performed. Also, the lift detection can be performed based on at least one adjusted image ADI. The lift detection means determining whether the optical navigation device 300 is lifted or not based on the adjusted image(s). Besides, the light source, such as the light source LS illustrated in FIG. 3 can be controlled based on at least one adjusted image ADI. For example, the power or the light emitting time of the light source LS can be controlled based on at least one adjusted image ADI, to meet different requirements.

In one embodiment, the optical navigation device 300 is an optical mouse, and a type of a mouse mat on which the optical navigation device 300 is located can be determined by at least one adjusted image ADI. For such case, reference images of different parts of the mouse mats can be pre-recorded in the optical navigation device 300 or any other storage device connected to the optical navigation device 300. After that, the images of the current mouse mat are processed by the above-mentioned image quality improving method to generate adjusted images, which are compared to the pre-recorded reference images, to determine the type of the current mouse mat.

Figure 6:
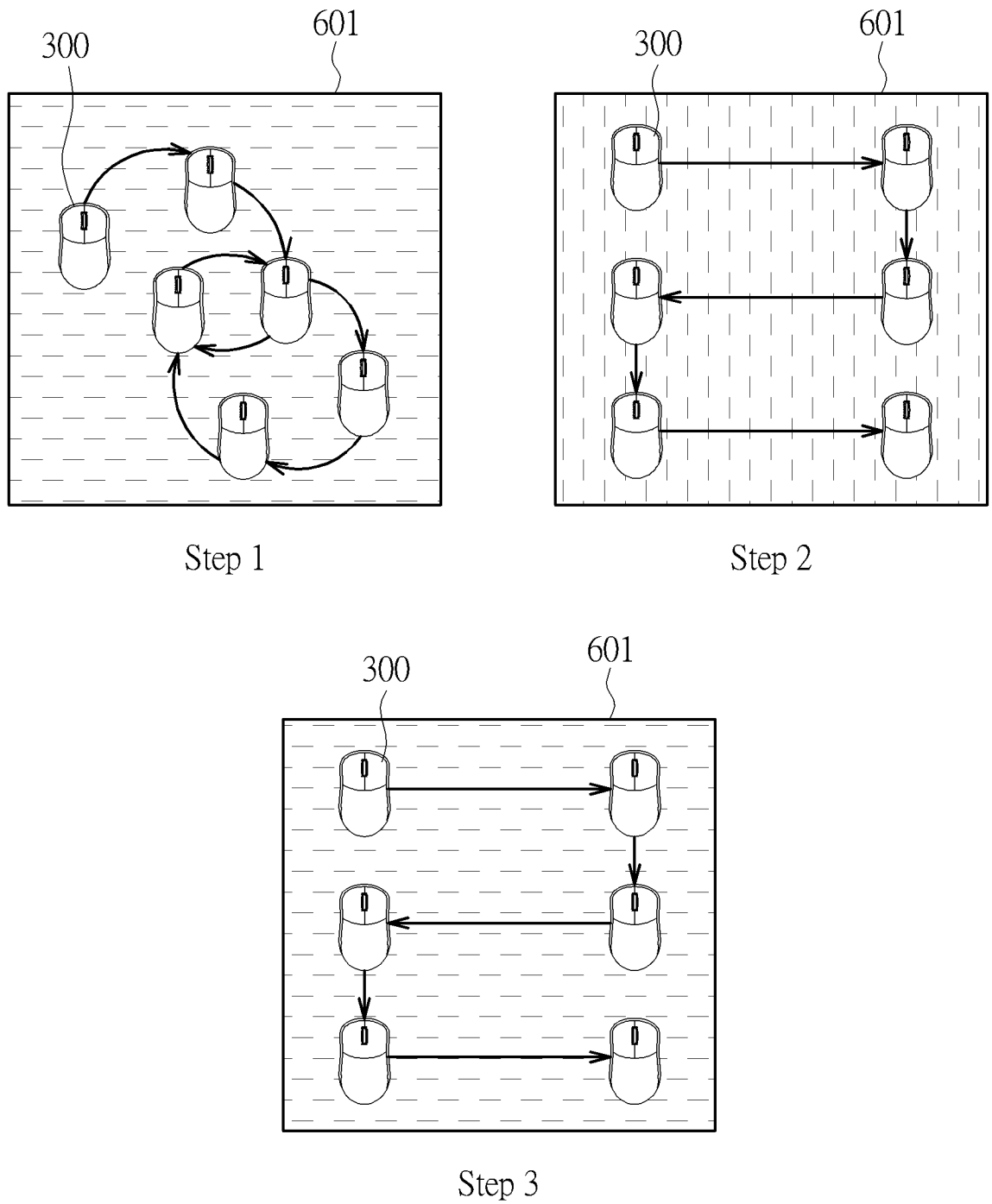
FIG. 6 is a schematic diagram illustrating a method for collecting reference images of a mouse mat according to one embodiment of the present invention.

Many methods can be applied to collect the above-mentioned reference images. FIG. 6 is a schematic diagram illustrating a method for collecting reference images of a mouse mat 601 according to one embodiment of the present invention. As illustrated in step 1 of FIG. 6, the optical navigation device 300 moves in various directions to record reference images of different parts of the mouse mat 601. In the step 2 of FIG. 6, the optical navigation device 300 moves in various directions different from the directions illustrated in step 1, and the mouse mat 601 is rotated 180 degrees clockwise. In the step 2, the reference images of the mouse mat 601 are also recorded. Further, in the step 3 of FIG. 6, the mouse mat 601 is rotated 180 degrees clockwise again, but the optical navigation device 300 moves in directions the same the directions illustrated in the step 2.

The moving directions of the optical navigation device 300 and the placement directions of the mouse mat 601 are not limited to the examples illustrated in FIG. 6. Therefore, the embodiment illustrated in FIG. 6 can be summarized as: collecting reference images of different parts of the mouse mat 601 for a plurality of combinations of moving directions of the optical navigation device 300 and the placement directions of the mouse mat 601. Also, it will be appreciated that the collecting of the images of different parts of the mouse mat is not limited to such example. Besides, the embodiments of determining the type of the mouse mat 601 can be applied to determine a type of a surface (e.g., a desk surface or a ground surface) on which the optical navigation device 300 is located.

In view of above-mentioned embodiments, image variations caused by various reasons such as mass production can be calibrated. Thus the image quality can be improved. Also, the operations of the optical navigation device performed based on the adjusted images can be more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
   an image sensor; and
   a processing circuit;
   wherein the processing circuit computes brightness contrast information of an original image captured by the image sensor, computes a brightness variation level of the original image, improves an image quality of the original image based on the brightness contrast information and the brightness variation level, to generate an adjusted image, and controls the optical navigation device to capture an image of a surface on which the optical navigation device is located according to the adjusted image;
   wherein the surface is a mouse mat, wherein the optical navigation device is an optical mouse and the processing circuit determines a type of the mouse mat;
   wherein the processing circuit performs following steps to determine the type of the mouse mat:
   collecting reference images of different parts of the mouse mat for a plurality of combinations of moving directions of the optical navigation device and placement directions of the mouse mat; and
   determining the type of the mouse mat via comparing images of a current mouse mat with the reference images.

2. A non-transitory computer readable recording medium, comprising at least one program stored therein, an optical navigation device control method is performed when the program is executed, the optical navigation device control method comprising:
   (a) computing brightness contrast information of original images captured by an image sensor of an optical navigation device;
   (b) computing brightness variation levels of the original images;
   (c) improving image qualities of the original images based on the brightness contrast information and the brightness variation levels, to generate adjusted images; and
   (d) computing movements of the optical navigation device based on displacement between the adjusted images;
   wherein the optical navigation device is an optical mouse located on a mouse mat,
   wherein the step (d) comprises:
   determining a type of the mouse mat;
   wherein the step (d) further comprises:
   collecting reference images of different parts of the mouse mat for a plurality of combinations of moving directions of the optical navigation device and placement directions of the mouse mat; and
   determining the type of the mouse mat via comparing images of a current mouse mat with the reference images.

3. The non-transitory computer readable recording medium of claim 2, wherein the step (c) improves an image quality of each one of the original images by an equation of:

$$\frac{B\_T - B\_Oav}{Std\_O},$$

B_T is a brightness value of a pixel of one of the original images which has the image quality being improved, B_Oav is an average brightness value of one of the original images which has the image quality being improved, and Std_O is a standard deviation of brightness values of one of the original images which has the image quality being improved, wherein the brightness contrast information comprises B_T and B_Oav, wherein the brightness variation level comprises Std_O.

4. The non-transitory computer readable recording medium of claim 2, wherein the step (d) comprises:
   determining whether the optical navigation device is lifted or not based on the adjusted images.

5. An optical navigation device, comprising:
   an image sensor; and
   a processing circuit;
   wherein the processing circuit computes brightness contrast information of original images captured by the image sensor, computes brightness variation levels of the original images, improves image qualities of the original images based on the brightness contrast information and the brightness variation levels, to generate adjusted images, and computes movements of the optical navigation device based on displacement between the adjusted images;
   wherein the optical navigation device is an optical mouse located on a mouse mat and the processing circuit determines a type of the mouse mat;
   wherein the processing circuit performs following steps to determine the type of the mouse mat:
   collecting reference images of different parts of the mouse mat for a plurality of combinations of moving directions of the optical navigation device and placement directions of the mouse mat; and
   determining the type of the mouse mat via comparing images of a current mouse mat with the reference images.

6. The optical navigation device of claim 5, wherein the processing circuit improves an image quality of each one of the original images by an equation of:

$$\frac{B\_T - B\_Oav}{Std\_O},$$

B_T is a brightness value of a pixel of one of by an equation of: the original images which has the image quality being improved, B_Oav is an average brightness value of one of the original images which has the image quality being improved, and Std_O is a standard deviation of brightness values of one of the original images which has the image quality being improved, wherein the brightness contrast information comprises B_T and B_Oav, wherein the brightness variation level comprises Std_O.

7. The optical navigation device of claim 5, wherein the processing circuit controls a light source of the optical navigation device based on the adjusted images.

8. The optical navigation device of claim 5, wherein the processing circuit determines whether the optical navigation device is lifted or not based on the adjusted images.

\* \* \* \* \*